Dec. 18, 1928.                                                   1,695,951
P. J. CUNNINGHAM
POWER TRANSMISSION
Filed July 29, 1927                        7 Sheets-Sheet 1

INVENTOR.
PHILIP. J. CUNNINGHAM.
BY Fetherstonhaugh & Co.
ATT'YS.

Dec. 18, 1928.

P. J. CUNNINGHAM 1,695,951

POWER TRANSMISSION

Filed July 29, 1927     7 Sheets-Sheet 2

FIG. 2.

INVENTOR.
PHILIP. J. CUNNINGHAM.
BY Fetherstonhaugh & Co.
ATT'YS.

Dec. 18, 1928.

P. J. CUNNINGHAM

1,695,951

POWER TRANSMISSION

Filed July 29, 1927     7 Sheets-Sheet 4

INVENTOR.
PHILIP J. CUNNINGHAM.
BY Fetherstonhaugh & Co.
ATT'YS.

Dec. 18, 1928.

P. J. CUNNINGHAM

POWER TRANSMISSION

Filed July 29, 1927

Patented Dec. 18, 1928.

1,695,951

UNITED STATES PATENT OFFICE.

PHILIP JOHN CUNNINGHAM, OF NEW YORK, N. Y.

POWER TRANSMISSION.

Application filed July 29, 1927. Serial No. 209,360.

This invention relates to improvements in power transmissions and particularly of the type adapted for use in motor vehicles wherein a change of speed is frequently necessary owing to changeable conditions.

One object of the invention is to eliminate the present difficult, tedious and unsatisfactory method of shifting gears through the medium of a manually operated gear shift lever.

A further object is to provide a transmission of this character which is in effect substantially automatic in operation.

With the foregoing and other objects in view the invention consists essentially of a gear box or casing within which are operatively mounted the regular train of gears to effect changes in speed of operation. Suitably positioned within the gear box adjacent the gears is a pair of vacuum operated pistons, lever connected to the gear shifting forks while the cylinders within which the pistons are operated are connected through a series of suitable conduits with the intake manifold and atmosphere respectively and operation is effected by the clutch pedal with which is associated the primary control valve.

Referring now to the accompanying drawings which illustrate my improved device and in which like characters of reference indicate corresponding parts in each figure

Figure 2<sup>A</sup> is a section on the line 2<sup>A</sup>— 2<sup>A</sup> of Figure 4, the series of conducting passageways being indicated in dotted lines.

Figure 3 is a section on the line 3—3 of Figure 2<sup>A</sup>.

Figure 16 is a section on the line 16—16 of Figure 4.

Figure 1:
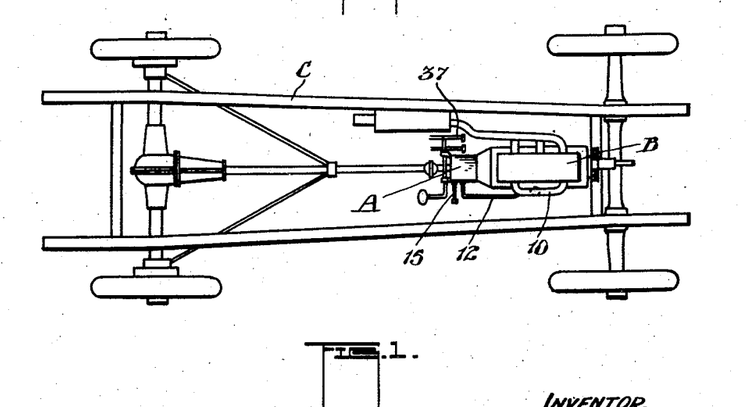
Figure 1 is a plan view of my improved transmission shown in position in a motor car.

In Figure 1, I have illustrated my improved transmission in operative position in an ordinary motor car, the transmission as a whole being indicated by the letter A, while B indicates the engine and C the car or chassis.

The shifting of the transmission gears in the present invention is effected through the medium of the intake manifold in which a vacuum is created by the operation of the engine. The intake manifold 10 is therefore connected to the passageway 11 of the transmission by the conduit 12 while the conduit 15 is connected to the passageway 14 one end being open to the atmosphere.

The transmission or gear box A, here illustrated, may be of any well known type and is provided with the usual train gears etc., which will be hereinafter referred to. The upper portion of the transmission which houses the gear control and operating mechanism is preferably solid or in block formation, as indicated at 16.

Although as previously stated the medium effecting the operation of the gears is the harnessed energy of the intake manifold, means are provided to control the path travel of the medium which comprise a primary valve 17, a secondary valve 18 and a speed control or distributing valve 19.

Figure 10:
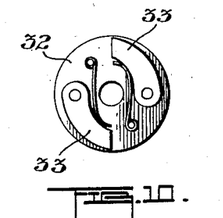
Figure 10 is a plan view of the cam gear ratchet.
Figure 11:
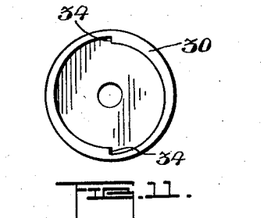
Figure 11 is an elevation looking at the rear of the cam housing.
Figures 12, 13, 14, 15:
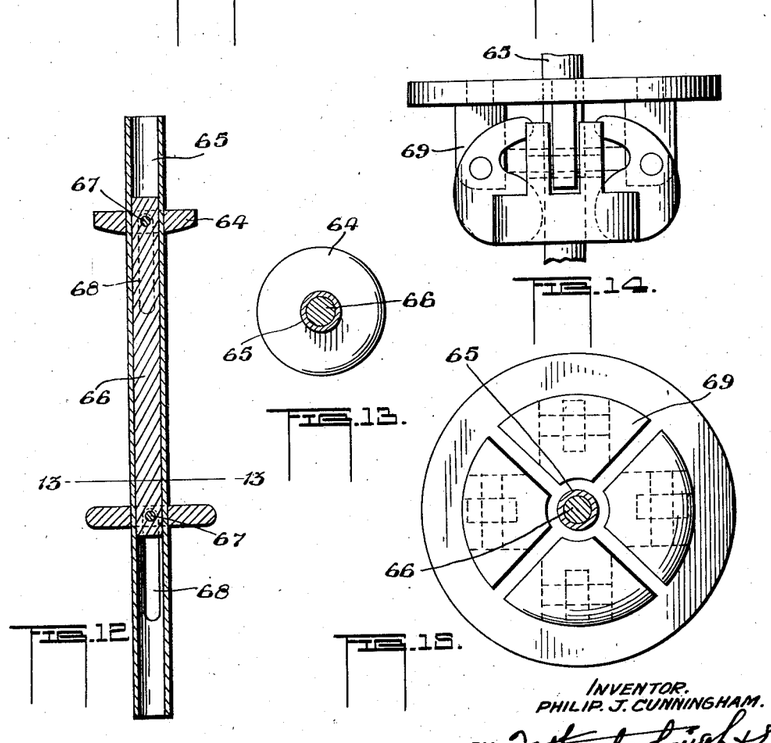
Figure 12 is a longitudinal section of the governor shaft.
Figure 13 is a section on the line 13—13 of Figure 12.
Figure 14 is an enlarged sectional elevation of the governor.
Figure 15 is an under side plan view of Figure 14.
Figure 15:
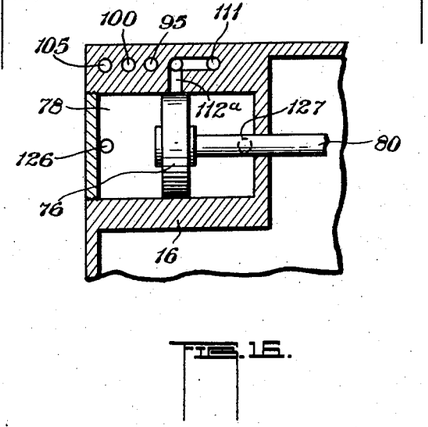
Figure 17:
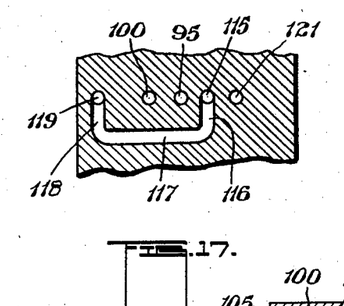
Figure 17 is a section on the line 17—17 of Fig. 2<sup>A</sup>.

The secondary valve, as is here shown, (see Figures 2 and 2^A) is in the form of a piston rod 20 and has mounted thereon in spaced relationship to each other a series of pistons 21, 22 and 23 all of which operate in the cylinder 24. For purposes of operation one end of the rod 20 is provided with a roller 25 adapted to engage a slot 26 formed in the lever 27 which is pivotally connected within the transmission as indicated at 28. The base of the lever 27 is enlarged and apertured adjacent its base, as indicated at 29, so as to accommodate the cam 30 which has mounted thereon the gear 31. The inside of this cam (see Figures 10 and 11) is adapted to house a ratchet disc member 32 provided with spring actuated dogs 33 which in operation engage the projections 34 formed on the cam 30.

As will be seen by referring again to Figure 2, the gear 31 is adapted to mesh with the toothed rack 35 formed on one end of the valve 17, the opposite end being pivotally connected to the lever 36 which is in turn connected to the clutch pedal 37. The apertures 38 and 39 extending through the valve 17 primarily control the flow of medium to the transmission and will be hereinafter more fully referred to.

At this stage of the description, it would be well to note that the valve 18 in operation does not in effect possess a neutral position, but rather two distinctive positions, the first of which (see Fig. 2) is designed to permit the gear shifting mechanism to operate from a neutral to an operative position, while the second position is designed to permit the gear shifting mechanism to move from an operative to a neutral position, each respective movement of which will be later referred to as gear operation and gear neutralizing position.

The operation of the valve 18 previously referred to is governed by the operation of the cam and ratchet members 30 and 32 respectively which in turn are operated through the valve 17. By referring to Figs. 2, 10 and 11, it will be seen that when the valve 19 is moved in one direction the cam 30 remains stationary and the dogs 33 ride free over the projections 34, then as the valve 17 is moved in a reverse direction the dogs 33 engage the projections 34 and cause the cam to make one-half revolution. From the foregoing it will be observed that two movements of the valve 17 are required for each movement of the valve 18. Consequently with each complete operation of the pedal 36, i. e. depression and release, the valve 18 assumes a different relative position within the cylinder 24 and retains this position until further operated. Thus each consecutive operation of the valve 18 permits, first, a flow of medium to operate a gear shifting mechanism from neutral to an operative position, and second, from operative to a neutral position.

Positioned adjacent the secondary valve 18 and parallel therewith is the control valve 19 (see Figures 2^A, 5, 6, 7 and 8) whose purpose is to so direct the medium introduced to the transmission as to effect the shifting of the gears. In referring to the valve itself which comprises a hollow casing 40 and an operating arm 41 the ball or body portion is provided with apertures 42, 43, 44 and 45 extending through both walls in parallel registration and apertures 46, 47, 48 and 49 at right angles thereto and extending through one wall.

Figure 6:
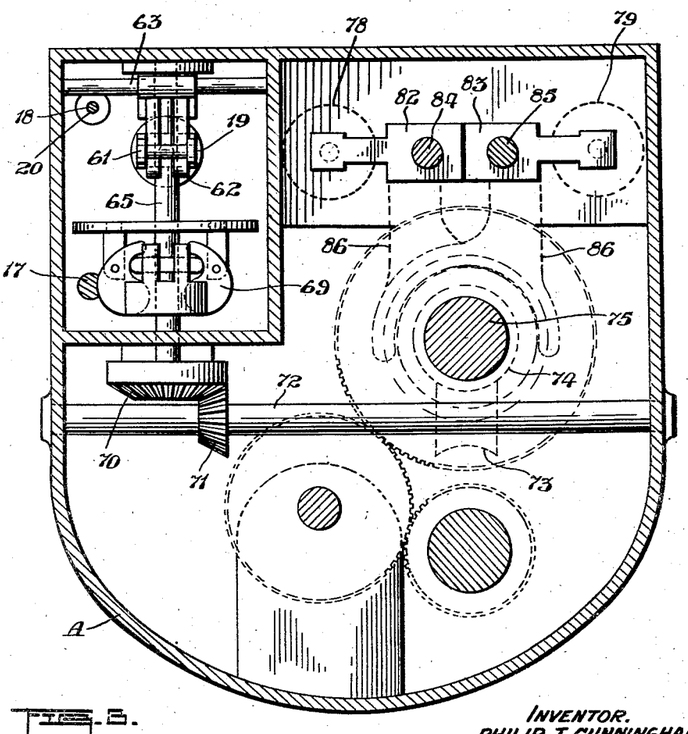
Figure 6 is a longitudinal section of Figure 5.

Within the hollow casing is a plunger member 50. This member is formed with ports 51, 52, 53 and 54 which communicate with ports 55, 56, 57 and 58 disposed at right angles thereto. The plunger is retained in position by means of an expansion spring 59 and for operative purposes is connected by the rod 60 to a forked member 61 which is in turn slidably connected to the double forked member 62. The arm 62^a of the member 62 is provided with depressions or grooves 62^b which correspond to working positions of the plunger 50.

For purposes of operation the member 62 is pivotally mounted within the transmission, as indicated at 63, and is adapted to engage the collar 64 which is slidably mounted on the hollow governor shaft 65. The collar member 64 is connected to the sliding rod or plunger 66 within the hollow governor shaft by pins 67 which extend through the longitudinal slots 68 in the governor shaft and permit the sliding movement of the rod 66 during the rotation of the shaft 65. Substantially midway of the shaft 65 is the governor 69. This member will according to its speed of rotation regulate the movement of the plunger 50 as will be later referred to. The opposite end of the shaft 65 has keyed thereon a bevel gear 70. This gear is adapted to mesh with the bevel gear 71 keyed to the shaft 72 which is operated through the worm gear 73 meshing with the worm 74 mounted on the drive shaft 75 (see Figures 2, 2^A and 3).

Within the solid portion of the transmission casing 16 and in spaced relationship are a pair of pistons 76 and 77. These pistons are adapted to operate in the cylinders 78 and 79 and are connected by the piston rods 80 and 81 to the shifting arms 82 and 83 which in turn are connected to the sliding rods 84 and 85 and the shifting forks 86. The rods 84 and 85 are operable in the valve forming sleeves 84ª and 85ª respectively and are adapted to be engaged by the spring actuated locking pins 87 and 88 which retain them at all times in a predetermined position.

To effect the operation of the transmission the cylinders 78 and 79 have communicating therewith through the various valves, a series of communicating passageways designed to control the flow of the operating medium therethrough to the cylinders as will now be described. In reference to Figure 2, it may be stated that the gears of the transmission are shown in neutral position, as are the valves 17 and 19 while the valve 18 is in a position to permit of the operation of the gear shifting mechanism from neutral to an operative position.

Figure 18:
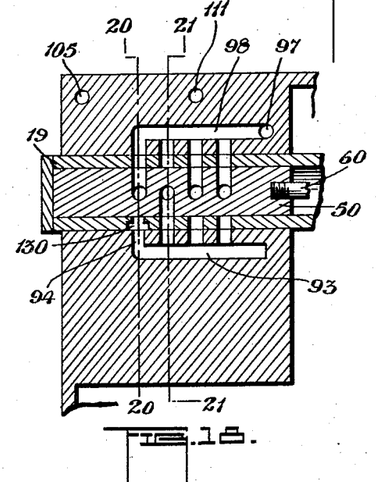
Figure 18 is a section taken on the line 18—18 of Fig. 2<sup>A</sup>.
Figure 19:
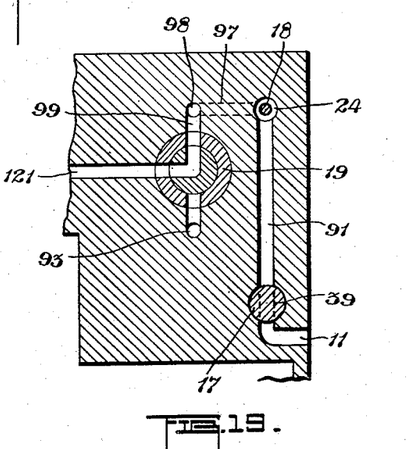
Figure 19 is a section taken taken on the line 19—19 of Fig. 2.
Figure 20:
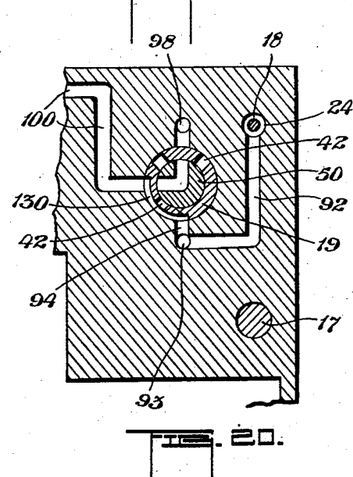
Figure 20 is a section taken on the line 20—20 of Figure 18 showing the operating valve in position for reverse with the bypass completing the air communicating passageways
Figure 21:
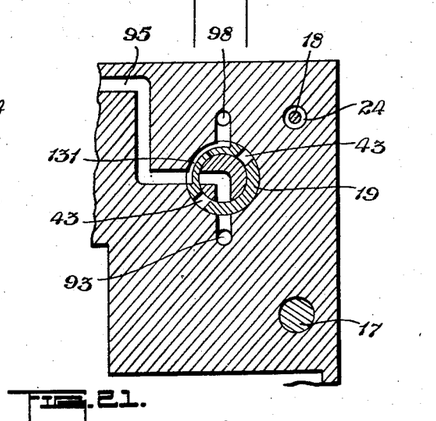
Figure 21 is a section taken on the line 21—21 of Figure 18 showing the operating valve in position for reverse with the bypass completing the vacuum communicating passageways.
Figure 22:
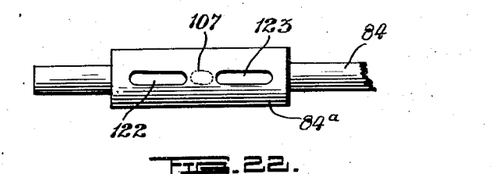
Figure 22 is an elevation of one of the orificed sliding rods and valve forming sleeve.

Assuming that the gears are to be changed from neutral to low gear, or what is commonly known as low speed, the control lever illustrated in Figure 18 is moved from "off" to "on" position, and the next operation is to open the conducting passageways, to permit of gears being shifted. This is accomplished as follows: The clutch pedal 37 is depressed. This action through the lever 36 causes the valve 17 to move outwardly, and the ports 38 and 39 therein to register with the passageways 90 and 91. which in turn communicate with the cylinder or bore 24.

Air is then admitted at atmosphere pressure to the cylinder 79 through the conduit 15, passageways 14 and 90 to the bore 24, and by passageways 92 and 93 to passageway 94, through the passageways 47 and 43 in the valve 19 and passageway 95, which communicates with the port 96 in the cylinder 79.

Figure 7:
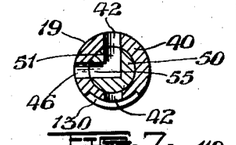
Figure 7 is a section on the line 7—7 of Figure 6.
Figure 8:
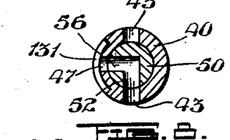
Figure 8 is a section on the line 8—8 of Figure 6.
Figure 9:
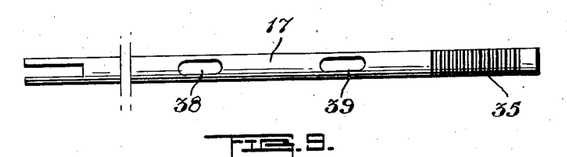
Figure 9 is a plan view of the primary valve.

Simultaneous with the aforementioned, a vacuum is created in the cylinder 79 by way of the conduit 12, passageways 11 and 91 and bore 24, passageways 97, 98 and 99 communicating with the ports 46 and 42 in the valve 19 (see Figure 2ᴬ and 7), and passageway 100 to port 101 in the cylinder 79.

The vacuum thus created in front of the piston 77 causes the piston to move outwardly and with it the members 81 and 83 to slide the transmission gears into first or low gear. This operation having been completed, the valve 17 in returning to neutral position operates the pinion 31, cam 30 and lever 27, which will cause the valve 18 to move outward of its cylinder, so that communication between the passageways 90, 91, 92 and 97 is cut off, while the valve 18 is in position to permit the flow of medium to move the gear shifting mechanism from operative to a neutral position.

Figure 2:
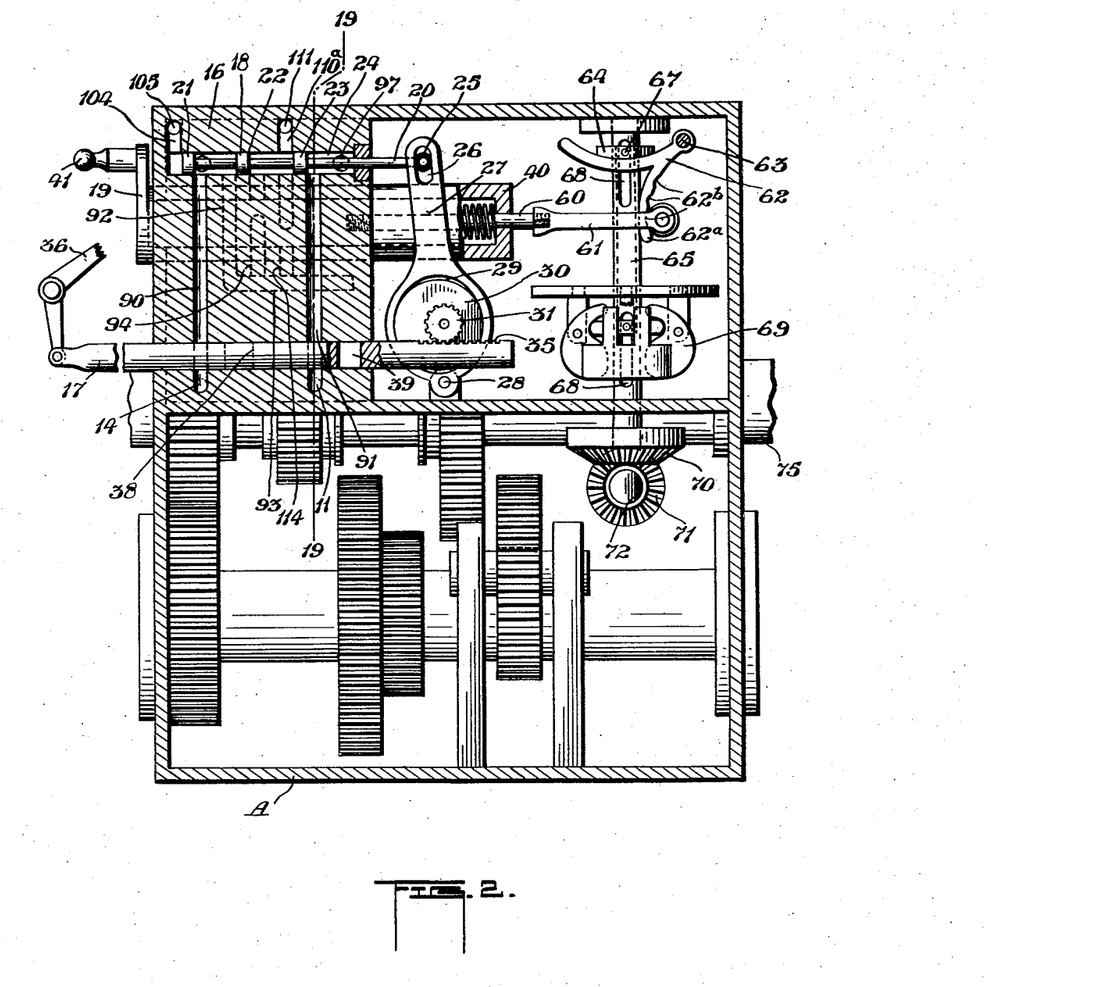
Figure 2 is a section on the line 2—2 of Figure 2<sup>A</sup>.
Figure 2A:
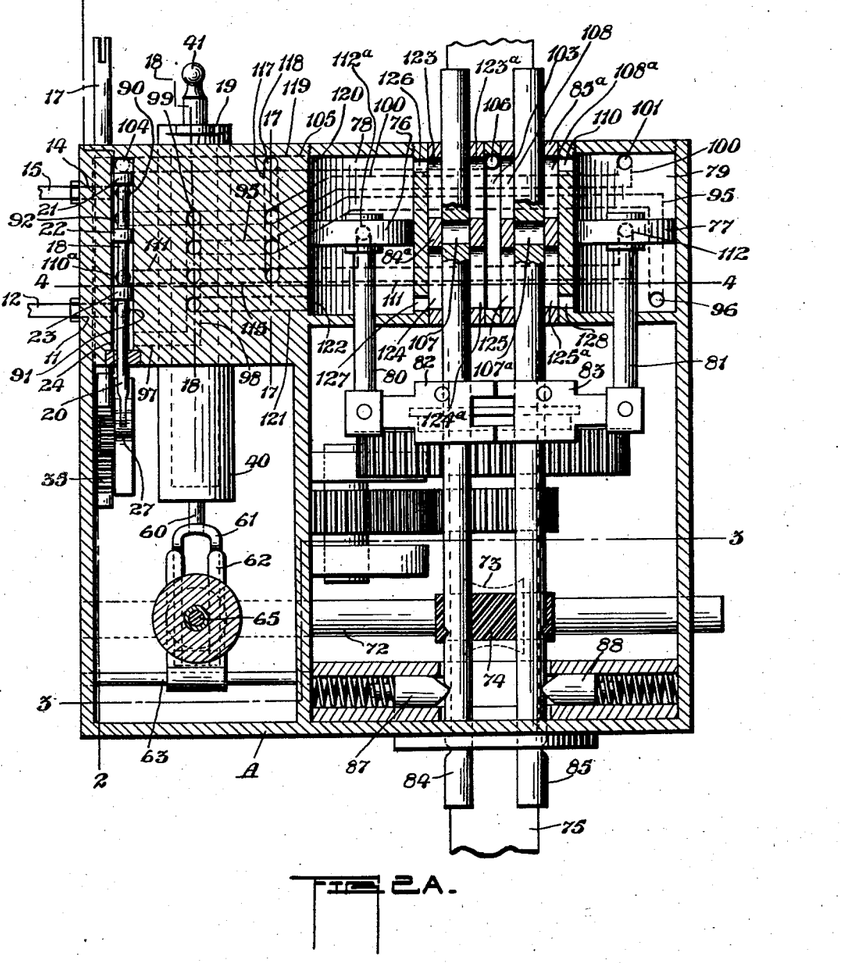

The motor vehicle by this time, it is assumed, is travelling at a speed of approximately three miles an hour, and is now to be changed to second speed, and for this purpose, must revert to neutral. This is effected as follows;

The clutch pedal 37 is depressed, and the ports 38 and 39 are brought into register with the passageways 14, 90, 11 and 91 respectively, and communication is established with the chamber 103 by the passageways 14, 90, 104, 105, and the port 106 (see Figures 2 and 2ᴬ). The rod 85 having been moved outwardly for first speed, the port 107ª in the member 85 will register with the ports 108 and 108ª of the sleeve 85ª and will permit the passage of air from the chamber 103 through the ports 108, 107ª, 108ª and 110 to the cylinder 79.

While the free passage above noted is established, a vacuum is conducted through the passageways 11, 91, 110ª, 111 and port 112, which operation causes the piston 77 to return to neutral position as shown in Figure 2ᴬ, moving therewith the transmission gears to neutral position.

While these movements have been progressing, the motor car is under way, moving as previously stated, at a speed of approximately three miles an hour.

The governor 69 has also been operated through the gears 70, 71, shaft 72, and gear 73, which meshes with gear 74 on the drive shaft 75.

Figure 4:
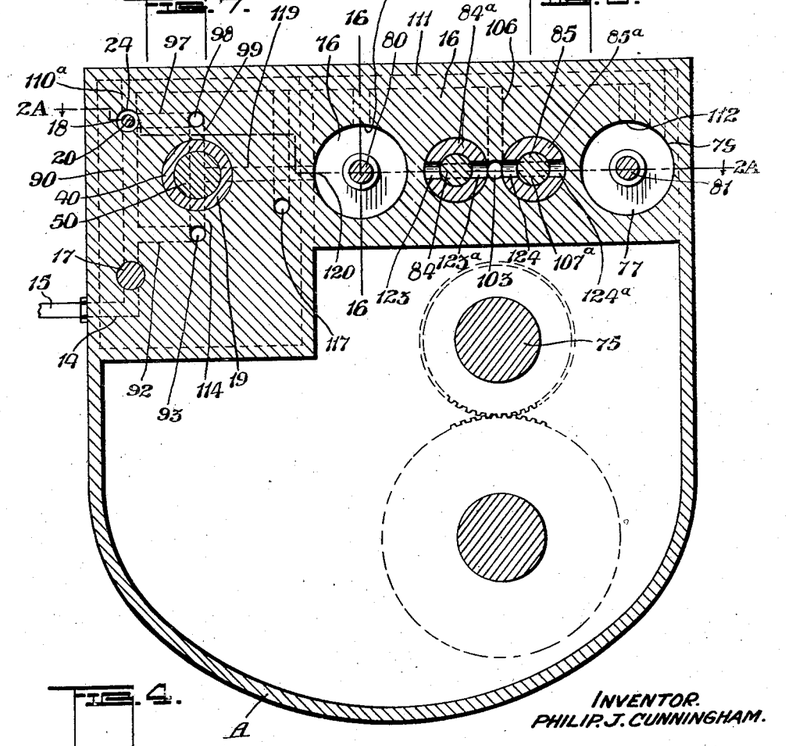
Figure 4 is a section on the line 4—4 of Figure 2<sup>A</sup>.
Figure 5:
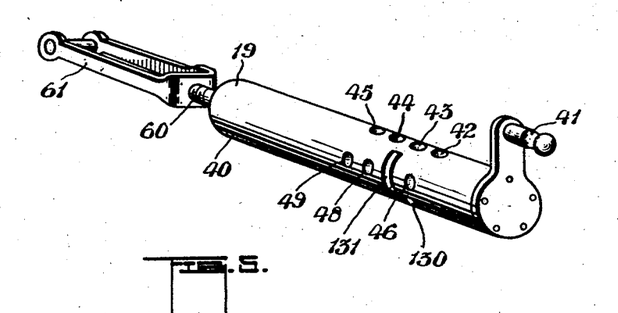
Figure 5 is a perspective view of the speed control valve.

The rotation of the shaft 65 causes the sliding shaft 66 to operate the arm 62ª, and thus move the plunger 50 of the valve 19 outwardly, so that the port 56 therein registers with the port 44 in the casing, and the passageway 115, the valve 18 having by this time through the operation of the cam and ratchet mechanism returned to a gear operative position. The clutch pedal being again depressed, atmospheric communication will be established through the conduit 15, passages 14 and 90, cylinder 24, passages 92, 93, 114, 44, 56, 115, 116, 117, 118 and 119 (see Figures 2, 2ᴬ and 4) with port 120 in the cylinder 78.

At the same time, a vacuum is effected through the conduit 12, passages 11 and 91, cylinder 24, passages 97 and 98, valve passageways 45 and 57 (see Figure 6) and passageway 121 to port 122. The free passage of air and the vacuum caused by the operation of the motor will thus cause the piston 76 to move inwardly and through the members 80, 82 and rod 84, slide the transmission gears into second or intermediate gear.

The motor car is now presumed to be moving at a speed of between 10 and 15 miles per hour, and it is now ready to be changed to third gear, or what is commonly known as high speed. This is accomplished by again depressing the clutch 37 as described in the previous speed changes. This action which has already been described, will neutralize the transmission gears, the port 112ª in the cylinder 78 functioning as does the port 112 in the cylinder 79.

At this stage of operation, it might be well to explain that each alternate inward or outward movement of the rods 84 and 85 for negotiating the various speeds cause the orifices 107 and 107ª therein to register with the ports 123, 123ª, 124, 124ª, 108, 108ª, 125, 125ª, respectively in the sleeves 84ª and 85ª according to operation. It will therefore be seen that selective communication may be established with the cylinders 78 and 79 through the respective ports 126, 127, 110 and 128 therein.

Returning now to the operation, the increased speed of the moving vehicle will reflect on the governor through the drive shaft 75, which will through mechanism previously described, cause the plunger 50 of the valve 19 to move still further outwardly, and the passageway 56 therein will register with the passageway 45. Atmospheric communication will then be completed to the cylinder 78 through the conduit 15, passages 14 and 90, cylinder 24, passageways 92 and 93, valve passageways 45 and 56 to passageway 121, and thence to port 122 in cylinder 78. At the same time a vacuum is created in the cylinder 78 through the conduit 12, passages 11 and 91, cylinder 24, passages 97 and 98, 44 and 55, (see Figure 6) and passageways 115, 116, 117, 118, 119 to port 120 in cylinder 78, the vacuum causing the piston 76 to move outwardly pulling the gear assembly into high speed.

From the foregoing it will be seen that the transmission gears have been changed in stages from neutral to first, then to second and then to third or high gear, and that at each change of gears the clutch pedal is operated to effect the neutralizing of the gears and shifting to the various speeds. The return to neutral from high gear is of course accomplished in a manner as has already been set forth.

Figure 23:
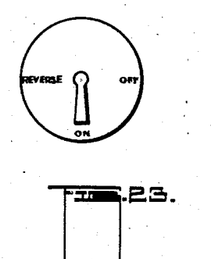
Figure 23 is a view of the operating control.

The reverse operation of the transmission to cause the vehicle to reverse its direction of movement is effected by the rotation of the valve 19 through the arm 41, which is manually operated by the switch member seen in Figure 23. The movement of the casing 40 of the valve 19 to the left causes the ports therein to change their respective relation with regard to the plunger 50.

To connect the series of passageways necessary to effect the reverse of the transmission gears, the shift mechanism being neutral, the clutch pedal is again depressed. This will permit of atmospheric communication being effected in the cylinder 79 through the conduit 15, passageways 14 and 90, cylinder 24, passageways 92, 93 and 94, a by-pass which is formed by the elongated-slot 130 in the valve casing 40, passage 100 to port 101 in the cylinder 79.

The vacuum in this instance simultaneously operates through the passages 11 and 91 to the cylinder 24, passageways 97 and 98, a by-pass which is formed by an elongated slot 131 in the casing 40, and passage 95 to the port 96 in the cylinder 79, causing the piston 77 to move inwardly and through it the reverse gears of the transmission, which through connections previously described, move to reverse position.

The return to neutral is accomplished in a manner similar to that of forward speeds, after which the switch is operated to the next desired position either "on" or "off".

From the foregoing description, it will be seen that the switch member, conveniently situated adjacent the driver of the motor vehicle, controls the operation of transmission to effect the various changes of speed, while the clutch pedal with which is associated further mechanism affects the distribution of an operating medium in such a manner as to enable the driver of the vehicle to shift from one speed to the other or neutral by the simple expedient of depressing and releasing the clutch pedal.

During the operation of the transmission, it will be noted that the control lever is in the "on" or "reverse" position and that each movement and subsequent movement of the gears is controlled through a series of flow control valves, whose operation is so synchronized as to simultaneously establish dual communication with the operating cylinder to operate the gears for change of speed, and that after each movement the gears are substantially in locked position, until further operated.

During the non operation of the transmission, the switch control is in the "off" which position rotates the flow distributing valve casing in such a manner as to render the transmission inoperative even though the clutch pedal be operated.

As many changes could be made in the above construction, and many apparently widely different embodiments of my invention, within the scope of the claims, constructed without departing from the spirit or scope thereof, it is intended that all matter contained in the accompanying specification and drawings shall be interpreted as illustrative and not in a limiting sense.

What I claim as my invention is:

1. A transmission unit for motor vehicles and the like, adapted to transmit power to motor vehicles at various speeds, comprising a casing, transmission gearing operatively mounted within the casing, including sliding gears, a solid block formed in the casing provided with a pair of cylinders, a series of bores, and a series of conducting passageways, pistons in said cylinders, and a series of intercommunicating valves in said bores, rod means connecting the pistons with the transmission sliding gears, operating means associated with said valves, and a master control lever adapted to control the operativeness of the transmission.

2. A transmission for motor vehicles and the like, adapted to transmit power for the operation of the motor vehicles at various speeds, and reverse, comprising in combination with a clutch operating pedal and drive shaft, of a casing, transmission gears within the casing, a solid block formed in the casing provided with cylinders and bores, pistons in the cylinders operatively connected to sliding gears in the transmission, a primary, a secondary and a speed control valve operatively mounted in the said bores, a series of conducting passageways establishing communication between the said valves and the cylinders, operative connecting means between the primary valve and the clutch pedal, adapted to operate the primary valve, connecting means associated with the primary valve adapted to operate the secondary valve, and a governor operatively connected to the speed control valve and the drive shaft, adapted to automatically operate said valve, when a predetermined speed of the vehicle has been attained.

3. A transmission of the character described, comprising in combination with a clutch pedal, and an intake manifold, of a casing, provided with transmission gears including sliding gears, pistons and valves mounted within the casing, and operatively connected to the sliding gears and clutch pedal respectively, a series of passageways in the casing, adapted to establish intercommunication between the valves and the cylinders, a conduit connecting the passageways of the casing and the intake manifold adapted to conduct a vacuum to the cylinders, a second conduit connecting the passageways with the atmosphere adapted to conduct air to the cylinders at atmospheric pressure, and a master control lever adapted to control the elementary flow of the vacuum between the intake manifold and the cylinders.

4. A transmission unit for motor vehicles and the like, adapted to transmit power to motor vehicles, at various speeds for forward and reverse movement, comprising a transmission casing, cylinders sleeves and valves within the casing, orificed gear shifting rods slidably operable within the sleeves in the casing and operatively connected to sliding gears, a series of communicating passageways in the casing adapted to establish communication between the valves and the cylinders, and orifices in the sliding rod sleeves adapted to establish communication between the passageways and the cylinders when the rods are in a predetermined position.

5. A transmission for motor vehicles and the like, adapted to transmit power to vehicles at various speeds, comprising a transmission casing, provided with cylinders, a series of passageways in the casing, a vacuum conducting conduit connecting the passageways and the intake manifold, a secondary conducting conduit connecting the passageways and the atmosphere a governor, a master control lever remote from the transmission, a primary valve in the casing adapted to be operatively connected to an operating pedal, a secondary valve adjacent the primary valve and operated thereby, a speed control valve adjacent the secondary valve operative in predetermined positions by the governor and, adapted after operation to permit of the conduction through the passageways of vacuum to the cylinders and air to the cylinders at atmospheric pressure, whereby on a vacuum being created by the operation of the engine and the primary valve given a predetermined movement, the transmission is changed from a neutral to an operative position.

6. The device as claimed in claim 2, in which the speed control valve is operated with a spring actuated orificed plunger adapted in second and third speed operation to change the relative register of the orifices therein.

7. A transmission for motor vehicles and the like comprising in combination with a transmission formed with a series of communicating passageways, of a main drive shaft, sliding transmission gears associated therewith, pistons in the cylinders operatively connected to the sliding gears, primary and secondary co-ordinating valves, a speed controlled valve, a governor operatively associated with the speed controlled valve and the main drive shaft, pedal operable means controlling the operation of the primary valve, conducting conduits connecting the passageways with an intake manifold and the atmosphere respectively, independent control means associated with the speed controlled valve to open and close communication in the passageways whereby when said independent means are operated to open said passageways subsequent depression of the pedal moves the primary valve to open position to automatically permit a piston to shift the sliding gears from neutral to first speed and subsequent release of the pedal moves the primary valve to closed position to lock the sliding gears in operative first speed position and to move the secondary valve to gear neutralizing position, and further subsequent depression of the pedal moves the primary valve to open position to automatically permit the piston through its associated mechanism to shift the sliding gear to neutral position, and further subsequent release of the pedal moves the primary valve to closed position and the secondary valve to gear operating position.

8. A device as set forth in claim 7 wherein when the operating pedal is given a third operative movement the primary valve is moved to open position and the speed controlled valve in accordance with the attained speed of the governor is automatically operated thereby to permit the operation of the sliding gears which are shifted from neutral to second speed position and subsequent release of the pedal will lock the gears in second speed position and move the secondary valve to gear neutralizing position and a fourth operative movement of the operating pedal moves the primary valve to open position and permits the sliding gear to be shifted from second speed position to neutral position and further subsequent release of the operating pedal moves the primary valve to closed position and the secondary valve to gear operating position.

9. A device as set forth in claim 7 wherein when the operating pedal is given a fifth operative movement the primary valve is moved to open position and the speed controlled valve in accordance with the attained speed of the governor is further automatically operated thereby to permit through associated mechanism the sliding gears to be shifted from neutral to high speed position and subsequent release of the pedal locks the gears in operative high speed position and moves the secondary valve to gear neutralizing position, and a sixth operative movement of the operating pedal moves the primary valve to open position and permits the sliding gears to be shifted from high speed to neutral position, and further subsequent release of the operating pedal moves the primary valve to closed position and the secondary valve to gear operating position.

10. A device as claimed in claim 7 wherein when the speed controlled valve is operated to reverse position and the operating pedal is given a seventh operative movement the primary valve is moved to open position to automatically permit a piston to shift a sliding gear from neutral to reverse speed position and subsequent release of the pedal moves the primary valve to closed position to lock the sliding gears in reverse operative position, and an eighth operative movement of the operating pedal moves the primary valve to open position to automatically permit the piston to shift the sliding gears from reverse to neutral position and a further subsequent release of the pedal moves the primary valve to closed position and the secondary valve to gear operating position.

11. A device as set forth in claim 2 in which the speed controlled valve is provided with a casing, a rotatable and slidably operable plunger, an operating crank associated with the casing, a series of registering ports in the plunger and a casing adapted to communicate with one another whereby upon the operation of the valve the relative register of the ports is changed in such a manner as to control the flow therethrough of an operating medium to a predetermined passageway.

12. A device as set forth in claim 7 in which the co-ordinating primary and secondary valves are connected through a cam, gear and ratchet mechanism, whereby on the primary valve being moved in one direction the secondary valve remains stationary and upon the movement of the primary valve in the opposite direction the secondary valve is operated to change its relative position and consequently change the direction of flow of the operating medium.

In witness whereof I have hereunto set my hand.

PHILIP JOHN CUNNINGHAM.